United States Patent
Clubley et al.

(10) Patent No.: US 7,466,728 B2
(45) Date of Patent: Dec. 16, 2008

(54) METHOD FOR LATERALLY-COUPLING FREQUENCY-CONVERTED LASER RADIATION OUT OF A RESONATOR

(75) Inventors: David Clubley, Glasgow (GB); R. Russel Austin, Cool, CA (US)

(73) Assignee: Coherent, Inc., Santa Clara, CA (US)

( * ) Notice: Subject to any disclaimer, the term of this patent is extended or adjusted under 35 U.S.C. 154(b) by 34 days.

(21) Appl. No.: 11/484,914

(22) Filed: Jul. 12, 2006

(65) Prior Publication Data

US 2007/0258688 A1    Nov. 8, 2007

(30) Foreign Application Priority Data

May 20, 2006   (GB) .................................. 0608805

(51) Int. Cl.
*H01S 3/10*   (2006.01)
(52) U.S. Cl. .......................................... 372/21; 372/22
(58) Field of Classification Search .................. 372/21, 372/22
See application file for complete search history.

(56) References Cited

U.S. PATENT DOCUMENTS

| 5,943,350 A | * | 8/1999 | Shichijyo ...................... 372/21 |
| 5,991,318 A | | 11/1999 | Caprara et al. ................ 372/22 |
| 6,167,068 A | | 12/2000 | Caprara et al. ................ 372/22 |
| 6,198,756 B1 | | 3/2001 | Caprara et al. ................ 372/22 |

* cited by examiner

*Primary Examiner*—Dung T Nguyen
(74) *Attorney, Agent, or Firm*—Stallman & Pollock LLP

(57) ABSTRACT

In traveling-wave ring-resonator an optically nonlinear crystal for converting visible radiation to ultraviolet (UV) radiation has an input face and two output faces. The visible light propagates through the crystal from the input face to one of the output faces. That output face is coated with a dichroic optical coating that transmits unconverted visible light and reflects the ultraviolet light. The reflected ultraviolet light exits the optically nonlinear crystal via the other output face and is coupled out of the resonator at an angle to the resonator axis.

19 Claims, 4 Drawing Sheets

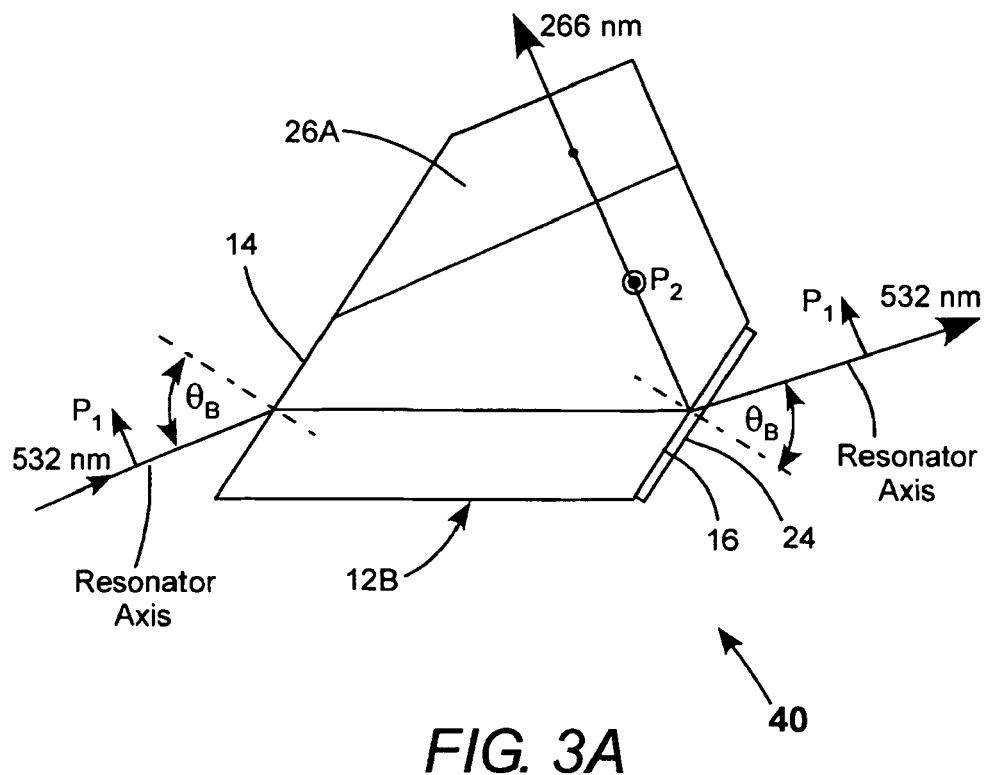
*FIG. 3A*
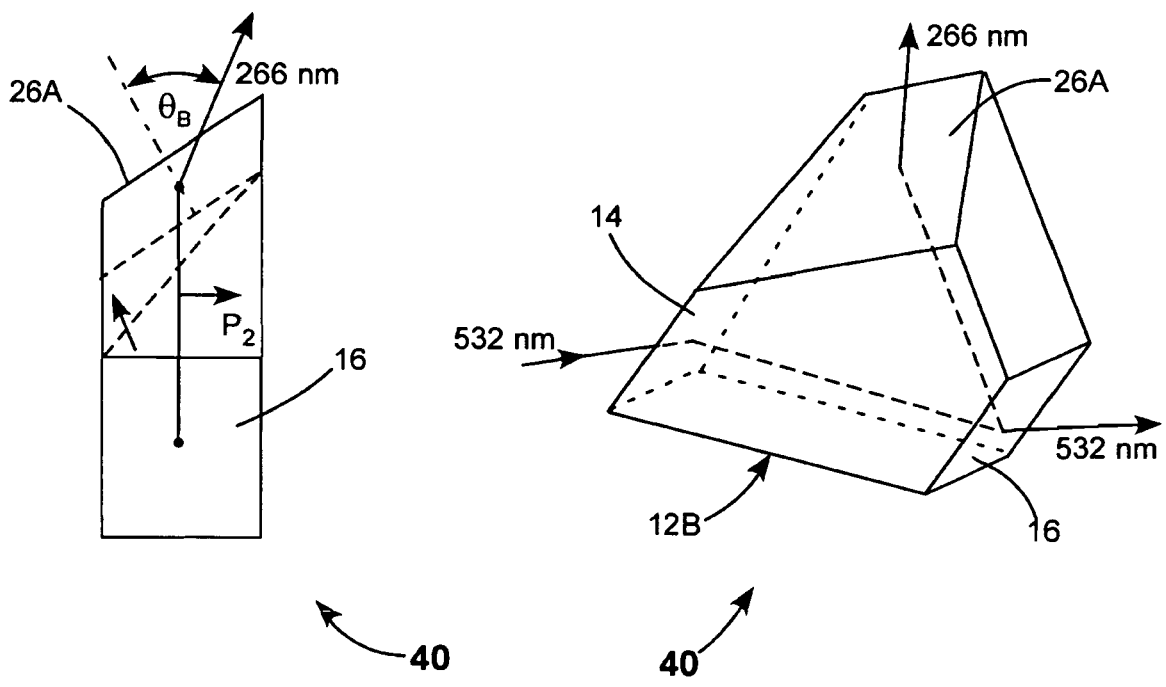
*FIG. 3B*  *FIG. 4*

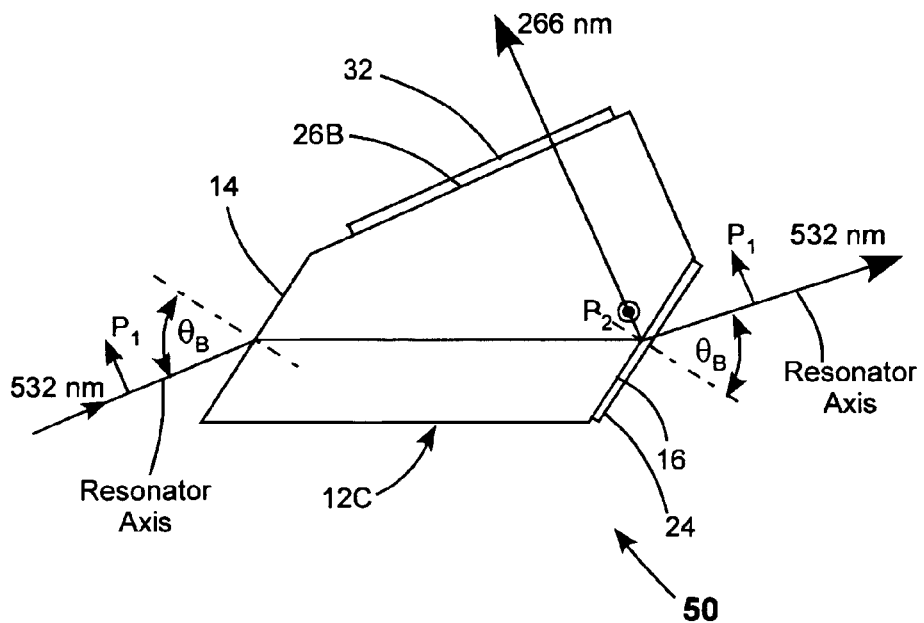
*FIG. 5A*
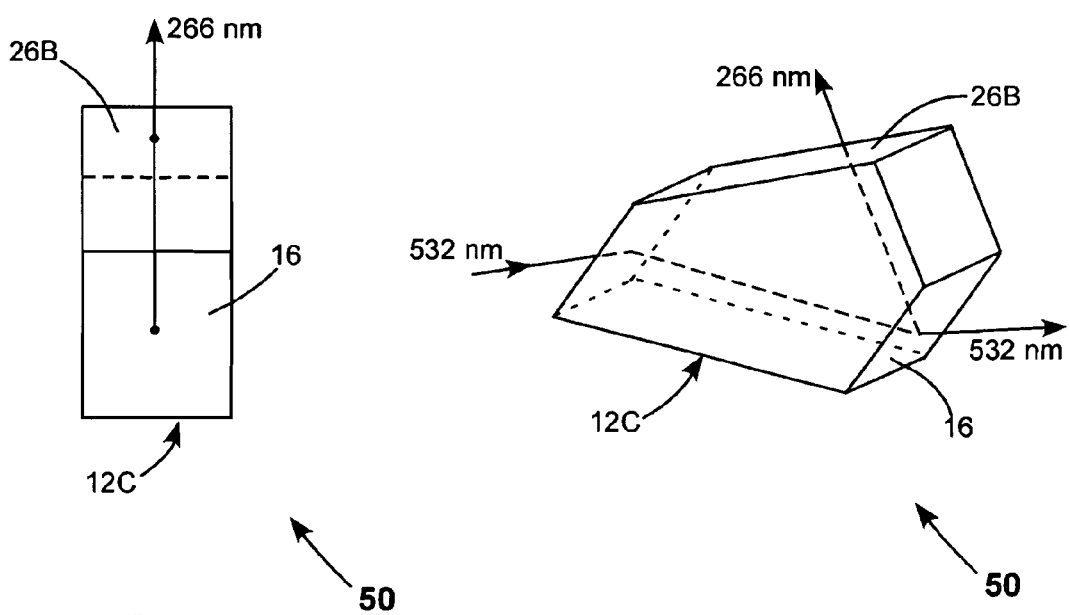
*FIG. 5B*  *FIG. 6*

METHOD FOR LATERALLY-COUPLING FREQUENCY-CONVERTED LASER RADIATION OUT OF A RESONATOR

PRIORITY

This application claims priority of United Kingdom Patent Application No. 0608805.8, filed May 4, 2006, which is incorporated herein by reference.

TECHNICAL FIELD OF THE INVENTION

The present invention relates in general to frequency-converting laser radiation to provide output radiation at a wavelength shorter than the wavelength of the laser radiation being frequency converted. The invention relates in particular to generating ultraviolet radiation by frequency converting longer-wavelength radiation and coupling the ultraviolet radiation out of a resonator in which the longer-wavelength radiation is being frequency-converted.

DISCUSSION OF BACKGROUND ART

Intra-resonator frequency multiplication of solid-state or optically pumped semiconductor (OPS) radiation laser radiation in optically nonlinear crystals is commonly used to generate ultraviolet UV laser radiation. The frequency multiplication may be carried out within an active resonator in which the fundamental laser radiation is being generated or may be carried out separately in a passive traveling-wave ring resonator that provides enhancement of the frequency conversion by re-circulating the radiation being converted through the optically linear crystal such that radiation not converted to UV radiation generated after one pass can generate further UV radiation on a subsequent pass.

UV radiation must be separated from radiation being converted to provide UV radiation output of the resonator. This is usually effected by including a mirror including a dichroic coating in the laser resonator. Such a mirror may be one of the mirrors defining the resonator, i.e., either a terminating mirror or a mirror folding the resonator axis, in which case the dichroic coating would be arranged to transmit the UV radiation and reflect the radiation being converted. The mirror may also be a separate mirror with the dichroic coating arranged to transmit the radiation, usually visible radiation, being converted, and to reflect the UV radiation out of the resonator, transverse to the resonator axis.

Problems are often encountered with dichroic-coated elements as such elements cannot be made entirely loss free, and are typically more lossy the shorter the wavelength of the radiation. Further, optically nonlinear crystal materials used for converting radiation to UV wavelengths are subject to degradation by the UV radiation being generated. Such optically nonlinear crystal materials include, but are not limited to, β-barium borate (BBO) and cesium lithium borate (CLBO). These problems must be taken into account when deciding how to best accomplish the UV output separation. As UV degradation can not be entirely avoided, most commercial lasers in which such optically nonlinear crystals are used for UV generation usually include an arrangement for periodically moving the crystal as degradation appears on parts of the crystal through which the UV radiation passes.

FIG. 1 schematically illustrates one prior-art arrangement 10 that is used to generate UV radiation having a wavelength of 266 nanometers (nm) by frequency-doubling radiation having a wavelength of 532 nm. In arrangement 10 an optically nonlinear crystal 12, has an entrance face 12 and an exit face 14. The crystal, here, is assumed to be a BBO crystal. The crystal is cut such that 532 nm radiation incident on face 12 at about the Brewster angle $\theta_B$ (for that wavelength) travels along a longitudinal axis 16 of the crystal and exits face 14 also at the Brewster angle, i.e., faces 14 and 16 are parallel to each other. The 532 nm radiation is plane-polarized with the polarization plane being parallel to the plane of incidence of face 14 (p-polarized), as indicated by arrow $P_1$. 266 nm radiation generated in the crystal follows the same path as the 532 nm radiation, and exits face 14 of the crystal at the Brewster angle for the 266 nm wavelength. There is a difference of approximately 1° between the exit angles of the 532 nm and 266 nm radiation. The 266 nm radiation is plane-polarized with the polarization plane being perpendicular to the plane of incidence of face 14.

The 532 nm radiation and 266 nm radiation are incident at the Brewster Angle for 532 nm radiation on a beamsplitter 18 having front and rear surfaces 20 and 22 respectively. There is a dichroic coating 24 on front surface 20. Rear surface 22 is uncoated. The dichroic coating reflects more than 95% of the incident 266 nm radiation and transmits more than 95% of the 532 nm radiation. By way of example, with commercially available coatings, the transmission of 532 nm radiation may be as high as 99.7% and the reflection of the 266 nm radiation may be as high as 96%. There is essentially no reflection of 532 nm radiation from surface 22 of the beamsplitter because of the Brewster-angle incidence of the radiation at the surface. Those skilled in the art will recognize, without further illustration or detailed description, that the path of the 532 nm-radiation depicted in FIG. 1 would be collinear with the longitudinal axis of a resonator in which the crystal was located.

Exit surface 16 of crystal 12 creates about 20% loss of the 266 nm radiation. This is because the 266 nm radiation is polarized in a plane perpendicular to the plane of incidence of surface 16 (s-polarized) as indicated by arrowhead $P_2$. It is possible, in theory at least, to reduce this loss by adding a suitable antireflection coating to surface 16. It has been found, however, that in a passive ring-resonator, such a coating rapidly fails. It is believed that this failure is due to local heating in the coating by the 532 nm radiation.

Preferably coating 24 is deposited by a Q-Plate™ process. This process is an ion-assisted deposition process capable of producing coatings with very low surface roughness, for example, on the order of about 1.4 Ångstrom units (Å.U). Such coatings are available from Coherent, Inc., of Santa Clara, Calif., the assignee of the present invention. Dichroic coating 24, deposited by the Q-Plate™ process, has exhibited a long lifetime in a passive ring resonator. Eventual UV degradation is, however, inevitable. This long lifetime, was also observed in a similar arrangement wherein 488 nm radiation is frequency-doubled to provide 244 nm UV radiation. The coating is highly efficient at extracting the 266 nm UV power with very loss of the 532 nm radiation. There is a need, however, for a UV out-coupling arrangement for a frequency-doubling resonator that does not exhibit the UV loss of the arrangement of FIG. 1 and does not require an optically nonlinear crystal having antireflection coatings in the path of radiation circulating in the resonator. Preferably, the arrangement should allow for translation of the crystal when parts of the crystal surfaces are degraded by UV radiation.

SUMMARY OF THE INVENTION

The present invention is directed to arrangements for coupling UV radiation out of a unidirectional optical resonator in which an optically nonlinear crystal is arranged to accept radiation having a first wavelength and propagating in one direction only and to convert a portion of the first-wavelength radiation to radiation having a second wavelength that is shorter than the first wavelength. One aspect apparatus in accordance with the present invention comprises an optical resonator having a resonator axis and arranged to cause a beam of optical radiation having a first-wavelength to circulate therein in one direction only along the resonator axis. An optically nonlinear crystal is located in the optical resonator on the resonator axis. The optically nonlinear crystal is arranged to convert the circulating first-wavelength wavelength radiation the second wavelength radiation, and to reflectively couple the second-wavelength radiation out of the resonator at an angle to the resonator axis.

In another aspect of the invention, the optically nonlinear crystal includes an input-face, and first and second outputfaces. An optical coating is deposited on the first output-face. The optical coating is a dichroic coating that is transmissive for the first wavelength radiation and reflective for the second wavelength radiation. The input face and the first output face of the optically nonlinear crystal are arranged such that the first-wavelength radiation is transmitted through the optically nonlinear crystal to the first output face of the crystal. The first and second output faces of the optically nonlinear crystal are arranged such that an unconverted portion of the first wavelength radiation is transmitted out of the optically nonlinear crystal through the first output-face thereof, and such that second wavelength radiation reflected from the optical coating is transmitted out of the optically nonlinear crystal via the second output face thereof.

In a preferred embodiment of the invention described hereinbelow, the optically nonlinear crystal is arranged for frequency-doubling the first-wavelength radiation in a passive ring-resonator. The input face and the first output face of the optically nonlinear crystal are arranged such that the first-wavelength radiation is incident on the input face and the first output face at about the Brewster angle.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 3A is a front elevation view schematically illustrating another preferred arrangement in accordance with the present invention for coupling UV radiation from a frequency-doubling ring-resonator, similar to the arrangement of FIG. 2, but wherein the lateral face of the optically nonlinear crystal is inclined in planes both perpendicular and parallel to the resonator axis.

FIG. 3B is a right hand side elevation view schematically illustrating the arrangement of FIG. 3A.

FIG. 4 is a three-dimensional view schematically illustrating further detail of faces of the optically nonlinear crystal in the arrangement of FIGS. 3A and 3B.

FIG. 5A is a front elevation view schematically illustrating yet another preferred arrangement in accordance with the present invention for coupling UV radiation from a frequency-doubling ring-resonator, similar to the arrangement of FIGS. 3A and 3B, but wherein the lateral face of the optically nonlinear crystal is inclined only in a plane parallel to the resonator axis.

FIG. 5B is a right hand side elevation view schematically illustrating the arrangement of FIG. 5A.

FIG. 6 is a three-dimensional view schematically illustrating further detail of faces of the optically nonlinear crystal in the arrangement of FIGS. 5A and 5B.

DETAILED DESCRIPTION OF THE INVENTION

Figure 1:
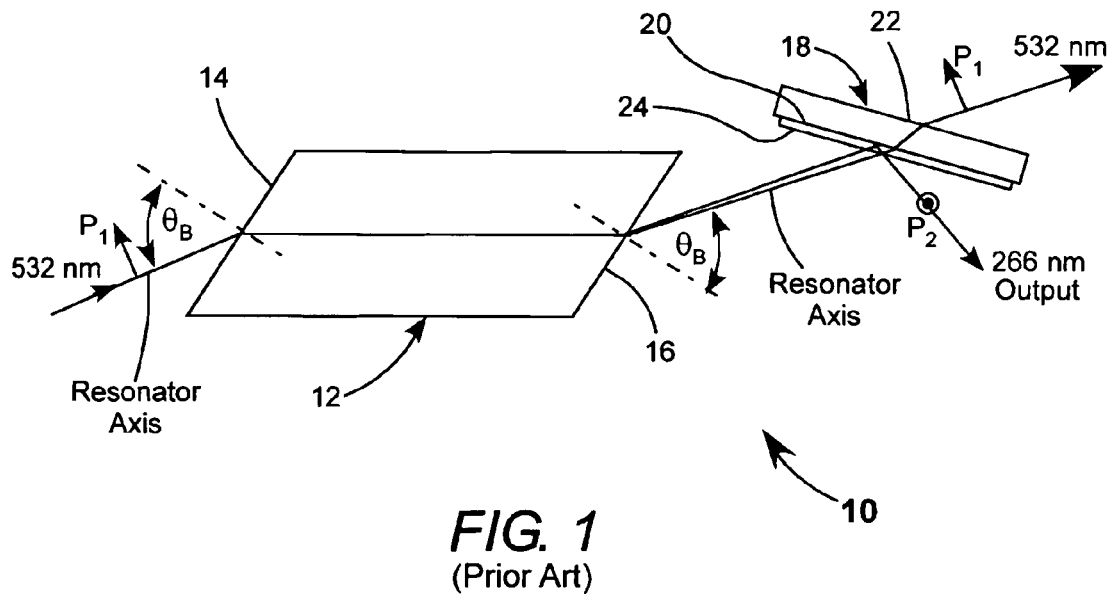
FIG. 1 schematically illustrates one prior-art arrangement for coupling UV radiation out of a frequency-doubling, traveling-wave, ring-resonator, the arrangement including an optically nonlinear crystal having an entrance face and an exit face for generating 266 nm (UV) radiation from 532 nm radiation by frequency-doubling, and a beamsplitter including a dichroic coating configured to transmit residual 532 nm along the resonator axis and reflect the 266 nm radiation away from the resonator axis as output radiation.
Figure 2:
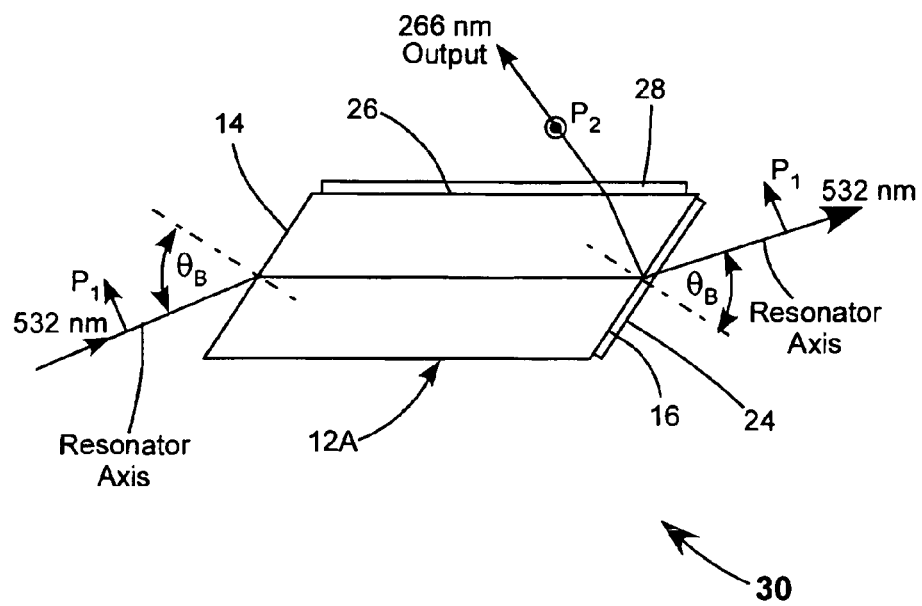
FIG. 2 schematically illustrates one preferred arrangement in accordance with the present invention for coupling UV radiation from a frequency-doubling ring-resonator, similar to the arrangement of FIG. 1, but wherein the beamsplitter is omitted and the dichroic coating is deposited on the exit face of the optically nonlinear crystal, with the 532 nm radiation being transmitted through the exit face along the resonator axis, and the reflected 266 nm radiation propagating laterally in the crystal and exiting the crystal via a lateral face thereof.

Continuing with reference to the drawings, wherein like components are designated by like reference numerals, FIG. 2 schematically illustrates a preferred arrangement 30 in accordance with the present invention for coupling UV radiation from a traveling wave frequency-doubling ring-resonator in which radiation being frequency doubled circulates in one direction only. Arrangement 30 is similar to above discussed arrangement 10 with an exception that dichroic beamsplitter 10 is omitted and the dichroic coating 24 is deposited instead on exit face of an optically nonlinear crystal 12A. Crystal 12A is similar to crystal 12 of FIG. 1 with an exception that a lateral face 26 of the crystal, not intercepted by the resonator axis, is polished. Coating 24 preferably has specifications discussed above with reference to the dichroic beamsplitter of FIG. 1.

266 nm radiation generated in optically nonlinear crystal 12A is reflected from exit face 16 back though the crystal and exits the crystal through lateral face 26 thereof. Face 26 can optionally be furnished with an antireflection coating 28 optimized for the appropriate polarization state and incidence angle of the 266 nm radiation. This coating, being on a face that is not intercepted by the resonator axis, will not be degraded by the 532 nm radiation circulating in the resonator. Such an antireflection coating may in fact provide a measure of protection for surface 28 from atmospheric moisture and the like.

It should be noted here that while Brewster $\theta_B$ is indicted in FIG. 2, and in other drawings referred to hereinbelow, as being on the air-side of faces of the optically nonlinear crystal, there is a corresponding Brewster angle within the crystal material which is 90-$\theta_B$. Reference to the Brewster angle in the following description and in the appended claims is applied interchangeably to both the air-side and material-side Brewster angles. Those skilled in the art will recognize from the context in which of the Brewster angles is referred to.

FIGS. 3A and 3B schematically illustrate another arrangement 40 in accordance with the present invention for coupling UV radiation from a frequency-doubling resonator. Arrangement 40 is similar to above discussed arrangement 30 of FIG.

2 with an exception that, in a crystal 12B of arrangement, 266 nm-exit-face 26 of crystal 12A is replaced by an exit face 26A that is inclined in a plane of incidence perpendicular to the resonator axis such that the 266 nm radiation is incident thereon, in that plane, at about the Brewster angle for that wavelength (see FIG. 3B). Face 26A is also inclined in a plane parallel to the resonator axis such that the 266 nm radiation is incident normally in that plane (see FIG. 3A). The arrangement of the crystal faces can be seen to advantage in the three-dimensional representation of FIG. 4. In this arrangement it is intended of course that face 26A be uncoated.

It is possible in any of the above-described arrangements 30, and 40 that the polarization plane $P_2$ of the 266 nm radiation reflected from face 16 undergoes some unpredictable rotation due to the birefringence of the crystal material and the length of the path traveled in the crystal by the 266 nm radiation. In this case, these arrangements may not be suitable, either because it would not be possible to select an appropriate inclination of the 266 nm exit face, or to design a suitable antireflection coating for the surface, each of which requires a precise knowledge of the polarization orientation. FIG. 5A, FIG. 5B and FIG. 6 schematically illustrate another arrangement 50 in accordance with the present invention for coupling UV radiation from a frequency-doubling resonator. This arrangement is designed to accommodate such unpredictability of the polarization plane of the 266 nm radiation at the exit face.

Arrangement 50 is similar to arrangement 40 of FIGS. 3A, 3B, and 4 with an exception that arrangement 50 includes a crystal 12C in which has a 266 nm radiation exit face 26B that is inclined only in a plane perpendicular to the resonator axis, and such that the 266 nm radiation is incident thereon at normal incidence in any two mutually perpendicular planes. This provides that the incident radiation will not be resolved into p-polarized and s-polarized components whatever the polarization orientation of the radiation. Accordingly, an antireflection coating thereon can be designed with very low reflection for unpolarized 266 nm radiation, and will be equally effective whatever the polarization orientation of the 266 nm radiation incident thereon.

Figure 7:
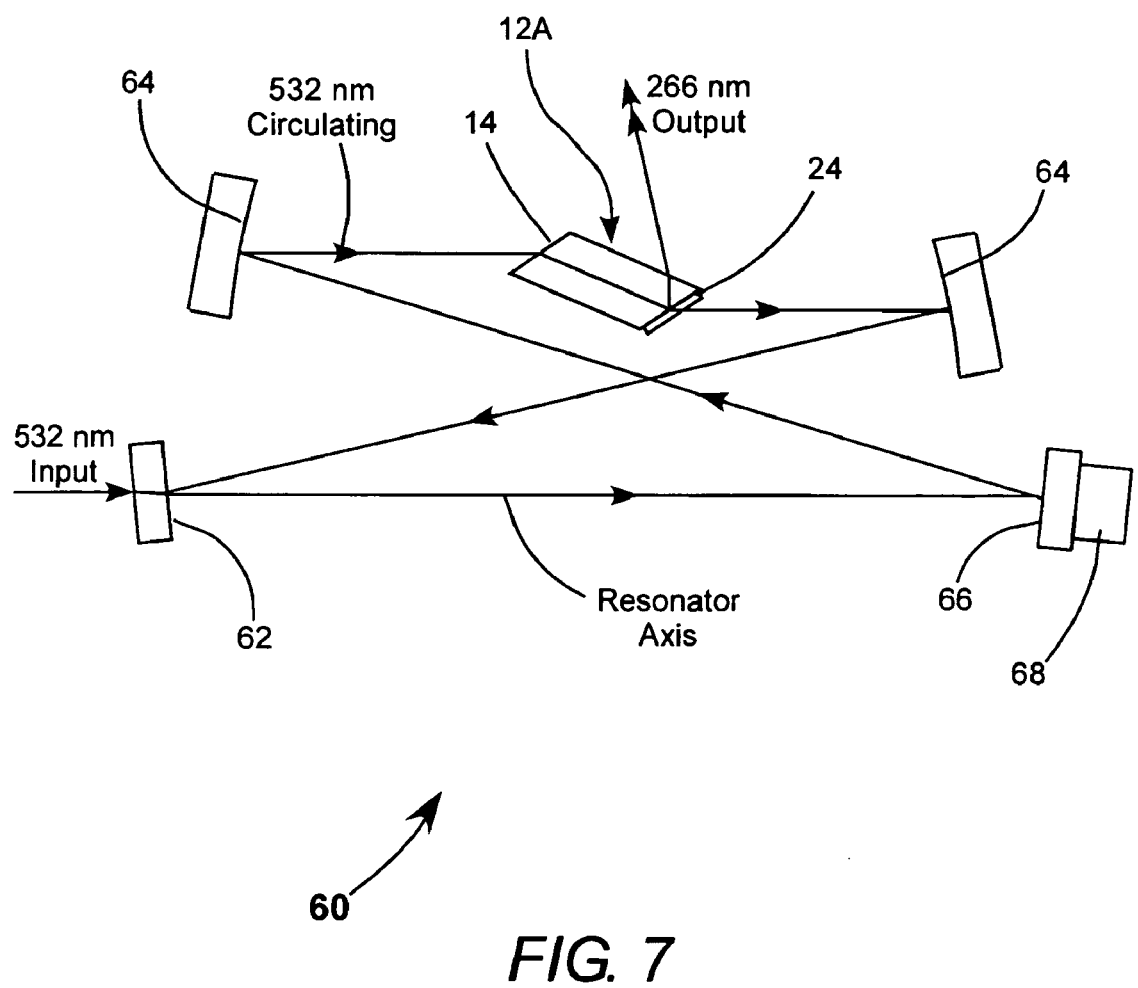
FIG. 7 schematically illustrates a preferred embodiment of a passive ring-resonator in accordance with the present invention, the resonator including the UV output coupling arrangement of FIG. 2

FIG. 7 schematically illustrates a preferred embodiment of a passive ring-resonator in accordance with the present invention for enhancing conversion of 532 nm radiation to 266 nm formed by a plane input mirror 624, two concave mirrors 64, and a plane mirror 66 the axial position of which can be adjusted by a piezoelectric driver 68 or the like. Frequency doubling is achieved by an optically nonlinear crystal 12A in the configured and arranged as described above within reference to FIG. 2 The crystal has an axial length of about 10.0 mm and is located axially mid-way between concave mirrors 64. All of the mirrors have high reflectivity for 532 nm radiation as is known in the art.

532 nm radiation to be frequency doubled is injected into the resonator via mirror 62. The resonator length is adjusted by moving mirror 66 such that 532 nm radiation circulating along the longitudinal axis of the resonator is in-phase on subsequent round trips, i.e., such that the resonator is in a resonant condition. When the resonator is adjusted to this, essentially all 532 nm radiation incident on mirror 62 from outside of the resonator enters the resonator. One well known technique for providing this phase adjustment is the Pound-Drever technique which, briefly described, involves monitoring and minimizing back reflection from reflection the mirror via a closed loop electronic arrangement with driver 68. A detailed description of this technique is not necessary for understanding principles of the present invention. Accordingly, no such description is presented herein. In one preferred configuration of resonator 60, mirrors 64 have radius of curvature of about 50.0 mm and are spaced apart to form a unit magnification relay that focuses the circulating 532 nm beam to a narrow waist inside crystal 12A. A particular advantage of the crystal arrangement is that the crystal and the beamsplitter are fixedly aligned. This simplifies shifting the crystal from time to time for exposing fresh portions of surfaces of the crystal to the 532 nm and 266 nm radiation.

Those skilled in the art will recognize that the while the above-discussed inventive arrangements are described in terms of converting 532 nm to 266 nm radiation by frequency doubling in a Brewster-cut optically nonlinear crystal (a BBO crystal in the above examples), principles of the invention are applicable to other resonant enhanced frequency-multiplication schemes wherein radiation is frequency converted in an optically nonlinear crystal for example sum-frequency mixing fundamental and second-harmonic radiation to provide third-harmonic radiation. It is also not necessary that entrance and exit faces of the optically nonlinear crystal be Brewster-cut. Any such arrangement, however, must be configured such that residual portions of radiation being converted are transmitted out of the crystal via one exit face, and that resultant frequency-converted radiation is reflected, from that exit face, out of the optically nonlinear crystal via another exit face that is not intercepted by the resonator axis.

It should also be noted that the resonator arrangement of FIG. 7 is merely exemplary and should not be construed as limiting the present invention. In particular, it should be noted that while the resonator of FIG. 7 is a passive resonator, with radiation to be converted injected into the resonator from without, principles of the invention are also applicable to an active unidirectional (traveling-wave) ring-resonator in which the first wavelength radiation is generated by energizing a gain-medium located in the resonator.

In summary, the present invention is described above in terms of a preferred and other embodiments. The invention is not limited, however, to the embodiments described and depicted. Rather, the invention is limited only by the claims appended hereto.

What is claimed is:

1. Optical apparatus comprising:
    an optical resonator having a resonator axis and arranged to cause a beam of optical radiation having a first-wavelength to circulate therein in one direction only along said resonator axis; and
    an optically nonlinear crystal located in said optical resonator on said resonator axis, said optically nonlinear crystal being arranged to convert said circulating first-wavelength wavelength radiation to optical radiation having a second wavelength shorter than said first-wavelength, and to reflectively couple said second-wavelength radiation out of said resonator at an angle to said resonator axis and wherein said optically nonlinear crystal has an input-face, and first and second output-faces and is arranged such that said circulating first wavelength radiation enters said crystal via said input face thereof and exits said optically nonlinear crystal via said first output face thereof, and such that said second-wavelength radiation is coupled out of said resonator via said second output face of said optically nonlinear crystal.

2. The apparatus of claim 1, wherein said input face and said first output face of said optically nonlinear crystal are arranged such that circulating first-wavelength radiation is incident on said input face at about the Brewster angle and exits said first output face at about Brewster-angle incidence thereto.

3. The apparatus of claim 1, wherein said second-wavelength radiation is incident on said second output face of said optically nonlinear crystal at about the Brewster angle.

4. The apparatus of claim 1, wherein said second output face of said optically nonlinear crystal is inclined such that said second-wavelength radiation is incident thereon at the Brewster angle in a first plane, and incident normally thereon in a second plane perpendicular to said first plane.

5. Apparatus of claim 1, wherein said second output face of said optically nonlinear crystal is inclined such that said second-wavelength radiation is incident thereon about normally in any two mutually perpendicular planes.

6. The optically nonlinear crystal of claim 5, wherein said second output face has an antireflection coating thereon said antireflection coating arranged to minimize reflection of unpolarized second-wavelength radiation.

7. The apparatus of claim 1, wherein said first wavelength is twice said second wavelength.

8. The apparatus of claim 1, wherein said optical resonator is a passive resonator formed by a plurality of mirrors and said optical resonator is configured such that first-wavelength radiation can be injected into said resonator via one of said plurality of mirrors to provide said circulating first-wavelength radiation.

9. The apparatus of claim 8, wherein said resonator is formed by two plane mirrors and two convex mirrors, wherein said optically nonlinear crystal is located between said convex mirrors, and wherein said first-wavelength radiation is injected into said resonator via one of said plane mirrors.

10. Optical apparatus comprising:
an optical resonator having a resonator axis and arranged to cause a beam of optical radiation having a first-wavelength to circulate therein in one direction only along said resonator axis; and
an optically nonlinear crystal located in said optical resonator on said resonator axis, said crystal being arranged to convert said circulating first-wavelength wavelength radiation to optical radiation having a second wavelength shorter than said first-wavelength, and to reflectively couple said second-wavelength radiation out of said resonator at an angle to said resonator axis and wherein said crystal has an input-face, and first and second output-faces, and wherein said first output face includes an optical coating being transmissive for the first wavelength and reflective for the second wavelength and wherein said faces are arranged so that said circulating first wavelength radiation enters said crystal via said input face thereof and exits said crystal via the coating on said first output face thereof, and such that said second-wavelength radiation is coupled out of said resonator via said second output face after being reflected by said coating on the first output face.

11. The apparatus of claim 10, wherein said input face and said first output face of said optically nonlinear crystal are arranged such that circulating first-wavelength radiation is incident on said input face at about the Brewster angle and exits said first output face at about Brewster-angle incidence thereto.

12. The apparatus of claim 10, wherein said second-wavelength radiation is incident on said second output face of said optically nonlinear crystal at about the Brewster angle.

13. The apparatus of claim 10, wherein said second output face of said optically nonlinear crystal is inclined such that said second-wavelength radiation is incident thereon at the Brewster angle in a first plane, and incident normally thereon in a second plane perpendicular to said first plane.

14. Apparatus of claim 10, wherein said second output face of said optically nonlinear crystal is inclined such that said second-wavelength radiation is incident thereon about normally in any two mutually perpendicular planes.

15. The optically nonlinear crystal of claim 14, wherein said second output face has an antireflection coating thereon said antireflection coating arranged to minimize reflection of unpolarized second-wavelength radiation.

16. The apparatus of claim 10, wherein said first wavelength is twice said second wavelength.

17. The apparatus of claim 10, wherein said optical resonator is a passive resonator formed by a plurality of mirrors and said optical resonator is configured such that first-wavelength radiation can be injected into said resonator via one of said plurality of mirrors to provide said circulating first-wavelength radiation.

18. The apparatus of claim 17, wherein said resonator is formed by two plane mirrors and two convex mirrors, wherein said optically nonlinear crystal is located between said convex mirrors, and wherein said first-wavelength radiation is injected into said resonator via one of said plane mirrors.

19. Optical apparatus comprising:
an optical resonator having a resonator axis and arranged to cause a beam of optical radiation having a first-wavelength to circulate therein in one direction only along said resonator axis; and
an optically nonlinear crystal located in said optical resonator on said resonator axis, said optically nonlinear crystal being arranged to convert said circulating first-wavelength wavelength radiation to optical radiation having a second wavelength shorter than said first-wavelength, and to reflectively couple said second-wavelength radiation out of said resonator at an angle to said resonator axis and wherein said optical resonator is a passive resonator formed by a plurality of mirrors and said optical resonator is configured such that first-wavelength radiation can be injected into said resonator via one of said plurality of mirrors to provide said circulating first-wavelength radiation and wherein said resonator is formed by two plane mirrors and two convex mirrors, wherein said optically nonlinear crystal is located between said convex mirrors, and wherein said first-wavelength radiation is injected into said resonator via one of said plane mirrors.

* * * * *